Jan. 23, 1968  F. DAUB  3,365,144
METHOD OF AND APPARATUS FOR CONTINUOUSLY FEEDING COILS
OF STRIP-LIKE MATERIAL TO A PROCESSING LINE
Filed July 14, 1966  2 Sheets-Sheet 1

INVENTOR
FRIEDRICH DAUB

BY
HIS ATTORNEY

Jan. 23, 1968  F. DAUB  3,365,144
METHOD OF AND APPARATUS FOR CONTINUOUSLY FEEDING COILS
OF STRIP-LIKE MATERIAL TO A PROCESSING LINE
Filed July 14, 1966  2 Sheets-Sheet 2

INVENTOR
FRIEDRICH DAUB

BY
HIS ATTORNEY

United States Patent Office 3,365,144
Patented Jan. 23, 1968

3,365,144
METHOD OF AND APPARATUS FOR CONTINUOUSLY FEEDING COILS OF STRIP-LIKE MATERIAL TO A PROCESSING LINE
Friedrich Daub, Dahlbruch, Germany, assignor to Siegener Machinenbau G.m.b.H., a corporation of Germany
Filed July 14, 1966, Ser. No. 565,179
Claims priority, application Germany, July 17, 1965, S 98,280
8 Claims. (Cl. 242—78.1)

ABSTRACT OF THE DISCLOSURE

The invention relates to a method and apparatus for increasing the productivity of a processing line, such as a pickling line, in a steel mill plant. It contemplates a method whereby two or more coils of strip are welded together and fed to a combined coiler and uncoiler device comprising at least two separate mandrels. Once a relatively large coil has been formed on one of the mandrels, it is rotated into a position to uncoil the strip into the processing line and at the same time the other mandrel has been positioned to receive strip for making a second relatively large coil. The coils making up the relatively large coils are adapted to be welded together after they are initially uncoiled and before they are received by one of the mandrels.

---

Figure 1A:
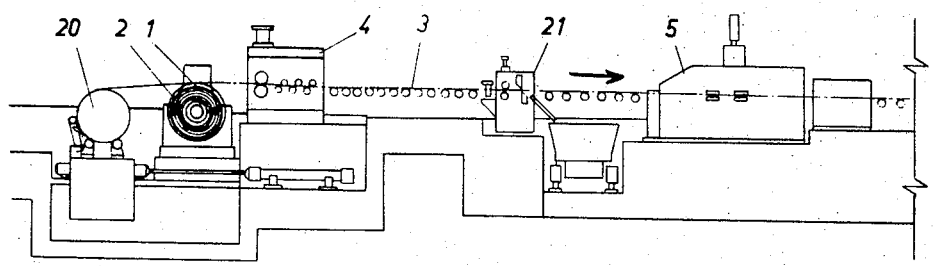

The invention concerns a method and an apparatus for operating preferably continuously working processing lines for strip, for example, strip pickling lines.

It is known that the delivered coils of strip subject to processing are to be unwound and that the front end of the strip is to be welded to the rear end of the preceding strip. Because the rough welding points during further processing manifest themselves disturbingly, it is necessary to rework them, for example, through planing, notching or the like. The periods of stoppage necessary during the welding and reworking are generally compensated by looping pits into which the strip is guided with intermittent speed. The large capacity of the looping pits required for compensating the long periods of stoppage bring about that during the entry and piling up the strip frequently buckles or kinks and suffers surface damages that cannot be fully corrected during the subsequent working processes.

It is known furthermore to effect the connection of unfinished coils to a coil provided for passage through processing lines in spatially separated preparation lines set up in proper working order. Here, too, there will be a relatively long period of lost time in bringing such coils to the payoff reel mounted ahead of the processing lines, for the opening of the coil, unwinding and straightening of the beginning of the strip, which for their compensation again require extensive looping pits in which damage to the strip mentioned above is likely to occur.

To avoid such damage to the strip, other strip-storing systems of corresponding capacity have become known in which, for example, the strip is formed into a plurality of loops by means of large diameter drums. At least the drums provided on one side are arranged on a power-operated displaceable strip looping car alongside an extended guide. It is true that thereby strip injuries are largely excluded, but the forces needed for the occasional tensioning of the strip are relatively high, so that the long guides to achieve the required stability call for a substantial expenditure and also the drive under heavy load of the high longitudinal and deformation forces demands high performances to be installed and used up in operation.

The present invention starts out from the problem of bringing about extensive protective treatment of the strip with comparatively slight means and to resolve this problem it proposes to convey unreeled and interconnected strips to a second reel which, each time the end of a strip is reached, is brought to a stop for the period of time required to bring another coil to the first reel for the advance and the welding of the front end of the strip and for the finishing of the welding point. The capacity of the subsequently arranged reel is adjusted such, that it corresponds to the size of coil to be taken from the processing line. Upon reaching the winding capacity of the second reel, the latter is connected with the strip entry of the processing line and the entering front end is joined to the rear end of the other strip by means of welding that is not subject to reworking and thereby serves essentially as tack welding during the passage through the processing line. The stoppage time required for the tack welding is so short that it can be compensated by means of a simple looping pit with freely sagging loops. In such a looping pit mutual contacts and injuries of the strip, creasing of the sides and the like, are excluded so that the required protection of the strip is achieved.

To assure a frictionless and rapid operating sequence, it turned out to be advisable to develop the second reel as a twin reel, whose winding mechanisms become effective alternatively so that a coil transfer from one reel pin or mandrel to the other one is avoided. Such twin reels are known per se, especially, in connection with reversing mills, in which the procurement of open reels with coil inserted unilaterally, in view of the high asymmetric loads conditioned by the heavy coils, is considered too great an expenditure; the solution thereof is offered by the twin reels in which the strip is fed to the first reel, whereas the second reel cooperates in the rolling process. Selected as a looping pit can be a construction with a chamber; but it has also proven itself to guide the strip in several loops through multichamber looping pits. In this case the loop sag is limited for a purpose, so that contact with the bottom of the looping pits is excluded.

In carrying out the method according to the invention, it has proven itself to provide for strip looping pits of small capacity in which the strip is sagging freely. Arranged ahead of the strip looping pits is a twin reel swingable on its foundation by 180 degrees and a welding machine. It turned out to be useful to associate exclusively with the welding station ahead of the twin reel, devices for finishing the welding points. In case of looping pits having more than one chamber, drive units are purposely provided between the latter, whose drives are associated with a regulating mechanism limiting the sag of the loops.

Figure 1B:
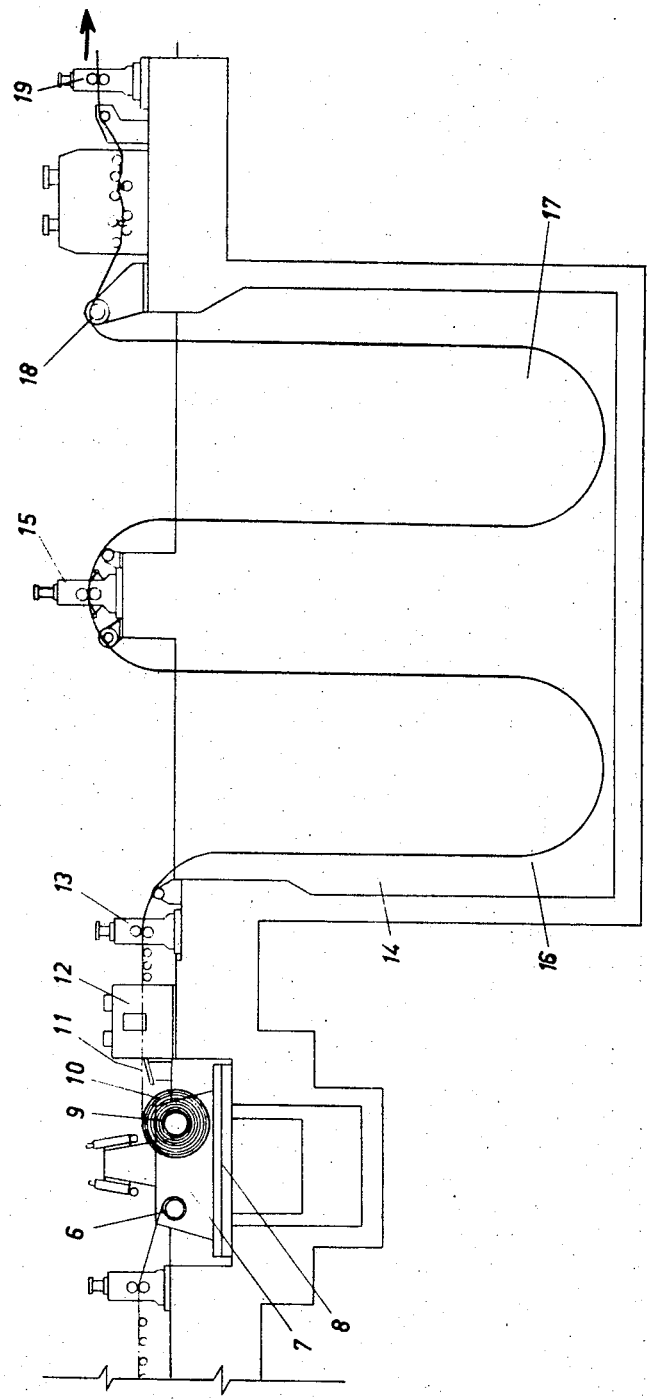

The invention will now be explained in detail with the aid of an embodiment represented in the accompanying drawing, FIGURE 1a and FIGURE 1b, FIGURE 1a being a schematic elevational view of the first part of the coil preparing and uncoiling equipment and FIGURE 1b being a similar view of the concluding portion of this equipment.

Shown in this drawing is a payoff reel 1 from which an unfinished coil 2 in unwound. The strip 3, after passing through the driving and straightening roll unit 4 is fed to the welding station 5, which aside from the welding machine includes equipment for reworking the occasional welding point, for example, through planing, notching or the like. Back of the welding station 5 the strip is wound on the mandrel 6 of a twin reel 7 into a relatively large coil. The twin reel 7 is by means of a turntable 8 and a drive (not shown in the figure) so developed that it can be turned around its vertical axis each time by 180 degrees.

The coil 10 arranged on the second mandrel 9 of the twin reel 7 is unwound, the unreeling strip 11 passes through the welding machine 12 and through the drive unit 13; it is conveyed to the looping pit 14 in which, lifted by the drive unit 15, it forms two loops 16 and 17, which are hanging freely inside the looping pit so that damage to the strip is eliminated. Upon leaving the looping pit the strip travels over a deflector roll 18 and after passing through drive rolls 19 and is conveyed to the processing line, e.g. a pickling line, not shown.

The present invention starts out from the idea that ordinarily the weight of the unfinished coils (2 and/or 20) depends on the weight of the processed ingots. To obtain processed coils with a large coil weight, it is frequently necessary to unreel several small unfinished coils in succession, weld their ends together and finish the welding point such that, especially in case of further rolling, there will be no difficulties. The entry part of the arrangement working according to the inventive method corresponds generally to that of known plants, that is to say, an unfinished coil 20 is held ready on a coil car and the strips unwinding from the reel 2 are interconnected during processing of the welding points in the welding station 5. The mandrel 6 of the twin reel 7 receiving the unwinding strip adapts itself in its winding speed to the unreeling speed of the strip 3. As the strip advances it is kept under tension. During the stoppage times for the coil change in the reel 2 as well as welding of the strip ends the mandrel 6 is stopped while strip is being unwound from the mandrel 9.

If in this way several smaller coils 2 are wound on the mandrel 6 so that the anticipated or predetermined capacity of the delivered coil is reached, the further advancement of the strip is stopped either on a coil end of the reel 1 or, if defined coil lengths are desired, after cutting the strip 3 in the shear 21 based on measurement or observation until the coil 10 on the reel mandrel 9 is completely unwound. After the end of the strip 11 leaves the twin reel 7, the latter by means of the turntable 8 is rotated round its vertical axis by 180 degrees, so that now the reel mandrel 6 carrying a full coil is in front of the welding machine 12. The end of the strip 11 already cropped in the shear 21 is now in the welding machine 12 opposite the externally unreeling end of the strip 3 and is joined to the latter, e.g. through butt welding. Because this welding serves purely and simply as a stitch or tack welding, it is not necessary here, too, to provide for time-consuming reworking processes. The half-turn or changing time of the twin reel 7 and the simple welding process in the welding machine 12 can be arranged so short that for the compensation of the rather short period of stoppage of the strip end 11 in the welding machine 12, only a minimum capacity of the strip looping pit 14 is necessary. A strip looping pit of such small capacity, however, can be developed without special difficulties such that the desired storing capacity with freely sagging strip is achieved. Especially with strip looping pits showing several loops 16, 17, it turns out to be useful to arrange ahead of the drive units, especially the drive unit 15, a regulating system that acts upon their driving mechanism and at least limits the loop lengths so that the strip is safely prevented from resting on the bottom of the pits.

The stitch welding effected in the welding machine 12 passes without trouble through the driving and squeezing rolls of the subsequently arranged pickling bath, and during the division of the continuously delivered strip at the end of the pickling, the strip is in a way known per se severed or cropped ahead of the receiving reel, before and/or after the stitch welding. Thus, it is possible without expensive means to achieve continuous travel of the strip through a processing line, whereby in case of need several raw or unfinished coils can be combined in proper rolling order into one starting coil without the danger of value-diminishing injuries to the strip.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. In a method of continuously feeding strip-like material to a processing line, such as a continuous strip pickling line in combination with a sequentially arranged uncoiling device, strip joining means, a convertible coiling and uncoiling device, the steps of:

completely uncoiling a first coil of strip toward said processing line by said uncoiling device and recoiling its leading end thereof by said convertible coiling and uncoiling device on the delivery side of said strip joining means, interrupting the recoiling of said first coil so as to position its trailing end in said strip joining means, partially uncoiling a second coil by said uncoiling device and stopping the uncoiling of the second coil so as to locate its leading end in said strip joining means, joining together said leading end and trailing ends of said first and second coil, and thereafter completing the uncoiling of said second coil and recoiling of the joined strips until a desired size coil has been formed by said convertible coiling and uncoiling device, and converting the coiling and uncoiling device to cause uncoiling of the joined coils to said processing line and at the same time commencing the recoiling of a subsequent coil uncoiled from said uncoiling device.

2. In a method according to claim 1 including the step of forming a relatively large diameter joined coil in comparison with the initial diameter of the first and second coils.

3. In a method according to claim 1 wherein there is provided a second strip joining means and a looping pit both being located between said convertible coiling and uncoiling device and said processing apparatus, the additional step of:

storing a portion of said joined coil in said looping pit in a manner that the strip is maintained in a freely suspended condition, locating the trailing end of said joined coil in said strip joining means, uncoiling a second joined coil by said convertible coiling and uncoiling device, and locating its leading end in said second strip joining means, and joining the two ends together to form a continuous strip for said processing line.

4. In a method according to claim 1 including a shear arranged between said uncoiling device and said convertible coiling and uncoiling device, the additional step of:

shearing the strip being fed to said convertible coiling and uncoiling device so as to control the size of the coil formed thereby.

5. In combination with an apparatus for processing strip-like material wherein there is arranged in sequential relationship, an uncoiling device for uncoiling coils of strip-like material in the direction of said processing apparatus, a strip joining means for joining the leading and trailing ends of successively uncoiled coils, a convertible uncoiling and coiling device comprising two rotatable reels on which joined coils are adapted to be formed, said reels being arranged and constructed to serve alternately to wind up coils of strip received from said strip joining means and uncoil said coils of strip to said processing apparatus, and means for alternately positioning said two reels so that when one reel is in a strip-coiling position, the other reel is in a strip-uncoiling position.

6. In combination with an apparatus for processing strip-like material according to claim 5, including a pair of looping pits arranged between said convertible coiling and uncoiling device and said processing apparatus, a second strip joining means located between said looping pits and said convertible coiling and uncoiling device adapted to join together succeeding coils uncoiled by said device, said pits adapted to gather and store a portion of a first joined coil to be fed to said processing apparatus, the construction being such that the strip is freely suspended in said pits.

7. In combination with an apparatus for processing strip-like material according to claim 5 wherein said reels are arranged to have their axes extending generally horizontally, a common support means for rotatably supporting said reels, said support means being rotatable about a vertical axis, the arrangement being such that on a 180 degree rotation of said support means, the reels are interchangeably positioned to recoil strip from said strip joining means in one case and uncoil strip to said processing apparatus in the other.

8. In combination with an apparatus for processing strip-like material according to claim 6, wherein a strip driving device is arranged between said looping pits and adapted to remove strip from one looping pit and advance it to the other.

References Cited
UNITED STATES PATENTS

| | | | |
|---|---|---|---|
| 2,195,008 | 3/1940 | Lessmann | 242—78.1 |
| 2,267,036 | 12/1941 | McArthur | 242—79 X |

FRANK J. COHEN, *Primary Examiner.*

N. L. MINTZ, *Assistant Examiner.*